US011597795B2

(12) United States Patent
Meisenheimer et al.

(10) Patent No.: US 11,597,795 B2
(45) Date of Patent: Mar. 7, 2023

(54) AMINE CATALYSTS FOR THE MANUFACTURE OF ISOCYANURATE POLYMERS

(71) Applicant: Covestro Intellectual Property GmbH & Co. KG, Leverkusen (DE)

(72) Inventors: Richard Meisenheimer, Cologne (DE); Paul Heinz, Leverkusen (DE); Dirk Achten, Leverkusen (DE); Frank-Stefan Stern, Bergisch Gladbach (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 0 days.

(21) Appl. No.: 17/045,544

(22) PCT Filed: Apr. 12, 2019

(86) PCT No.: PCT/EP2019/059482
§ 371 (c)(1),
(2) Date: Oct. 6, 2020

(87) PCT Pub. No.: WO2019/197639
PCT Pub. Date: Oct. 17, 2019

(65) Prior Publication Data
US 2021/0155747 A1 May 27, 2021

(30) Foreign Application Priority Data
Apr. 13, 2018 (EP) .................... 18167251

(51) Int. Cl.
C08G 18/79 (2006.01)
C08G 18/02 (2006.01)
C08G 18/18 (2006.01)
C08G 18/28 (2006.01)
C08G 18/72 (2006.01)
C08G 18/73 (2006.01)
C08G 18/75 (2006.01)
C08J 5/04 (2006.01)

(52) U.S. Cl.
CPC ......... C08G 18/792 (2013.01); C08G 18/022 (2013.01); C08G 18/1825 (2013.01); C08G 18/1833 (2013.01); C08G 18/2875 (2013.01); C08G 18/722 (2013.01); C08G 18/73 (2013.01); C08G 18/755 (2013.01); C08J 5/04 (2013.01); C08G 2115/02 (2021.01)

(58) Field of Classification Search
CPC .. C08G 18/792; C08G 18/73; C08G 18/1825; C08G 18/022; C08G 18/1833; C08G 18/722; C08G 18/2875; C08G 18/755; C08G 2115/02; C08J 5/04
See application file for complete search history.

(56) References Cited

U.S. PATENT DOCUMENTS

| 3,786,030 | A | * | 1/1974 | Rice | ................... | C08G 18/1841 |
| | | | | | | 528/53 |
| 3,896,158 | A | | 7/1975 | Rice | | |
| 3,996,223 | A | | 12/1976 | Gupta et al. | | |
| 4,026,840 | A | | 5/1977 | Bechara et al. | | |
| 4,049,931 | A | | 9/1977 | Sandner et al. | | |
| 4,100,118 | A | * | 7/1978 | Numata | ................. | C08G 18/58 |
| | | | | | | 523/458 |
| 4,122,038 | A | | 10/1978 | Sandner et al. | | |
| 4,255,569 | A | | 3/1981 | Muller et al. | | |
| 4,837,359 | A | | 6/1989 | Woynar et al. | | |
| 4,960,848 | A | | 10/1990 | Scholl et al. | | |
| 4,994,541 | A | | 2/1991 | Dell et al. | | |
| 5,064,960 | A | | 11/1991 | Pedain et al. | | |
| 5,076,958 | A | | 12/1991 | Pedain et al. | | |
| 5,506,328 | A | * | 4/1996 | Chandalia | ............ | C09D 175/00 |
| | | | | | | 528/80 |
| 5,914,383 | A | | 6/1999 | Richter et al. | | |
| 6,410,608 | B1 | * | 6/2002 | Sakai | ..................... | C08G 18/18 |
| | | | | | | 521/128 |
| 9,816,008 | B2 | | 11/2017 | Aou et al. | | |
| 2008/0090943 | A1 | | 4/2008 | Xu et al. | | |
| 2008/0234402 | A1 | | 9/2008 | Lehmann et al. | | |
| 2014/0005288 | A1 | * | 1/2014 | Chen | ...................... | C08G 18/06 |
| | | | | | | 521/170 |
| 2015/0125703 | A1 | * | 5/2015 | Lindner | .................. | B32B 27/28 |
| | | | | | | 428/422.8 |
| 2016/0319094 | A1 | * | 11/2016 | Diendorf | ................ | C08G 18/14 |
| 2019/0136005 | A1 | | 5/2019 | Williams et al. | | |
| 2019/0255788 | A1 | | 8/2019 | Hocke et al. | | |

FOREIGN PATENT DOCUMENTS

| DE | 2414413 A1 | 10/1975 |
| GB | 1145952 A | 3/1969 |
| GB | 1244416 A | 9/1971 |
| JP | 2000327741 A | * 11/2000 |
| JP | 2004182927 A | 7/2004 |
| WO | 2017166188 A1 | 10/2017 |
| WO | 2018054776 A1 | 3/2018 |
| WO | WO 2019096813 A1 | 5/2019 |

OTHER PUBLICATIONS

J. Prakt. Chem. 336 (1994) 185-200.
International Search Report, PCT/EP2019/059482, dated Jul. 24, 2019, Authorized officer: Ute Neugebauer.

* cited by examiner

Primary Examiner — Rabon A Sergent
(74) Attorney, Agent, or Firm — Jed C. Benson

(57) ABSTRACT

The present invention relates to the use of tertiary amines as catalysts for the cross-linking of isocyanate groups which are aliphatically and/or cyclo-aliphatically bonded. The catalysts according to the invention have the particular advantage that they are thermally latent.

18 Claims, No Drawings

AMINE CATALYSTS FOR THE MANUFACTURE OF ISOCYANURATE POLYMERS

CROSS-REFERENCE TO RELATED APPLICATION

This application is a national stage application under 35 U.S.C. § 371 of PCT/EP2019/059482, filed Apr. 12, 2019, which claims the benefit of European Application No. 18167251, filed Apr. 13, 2018, each of which is incorporated herein by reference.

FIELD

The present invention relates to the use of tertiary amines as catalysts for crosslinking of aliphatically and/or cycloaliphatically bonded isocyanate groups to one another. The catalysts according to the invention have the particular advantage that they are thermolatent.

BACKGROUND

The production of isocyanurate plastics by the crosslinking of aliphatically or cycloaliphatically bonded isocyanate groups with one another, i.e. without the involvement of thiol, hydroxyl or amino groups, is known per se. It has also been described previously that such materials are employable as a polymer matrix for composite materials.

Most of the catalysts described for the trimerization reaction of aromatic isocyanates to afford PIR (rigid polyisocyanurate foams) which is well known in the prior art are not suitable for catalysis of the trimerization reaction of the much less reactive aliphatic isocyanates. The catalysts described in the literature are either insufficiently reactive and require long curing times at high temperatures or excessively reactive and do not allow controlled progress of the reaction.

While aromatic isocyanates are to a large extent converted into rigid foams and flexible foams where a rapid onset of reaction is desired, aliphatic isocyanates are mainly employed in paints and adhesives and also in potting compounds as crosslinking components for producing polyurethanes. In these applications catalysts allowing a long pot life of the reaction mixture and a short reaction time at elevated temperature are preferred. In the case of aromatic isocyanates long pot lives are achievable only through the use of additional inhibitors on account of their high reactivity.

The need for a catalyst having a long pot life at room temperature and a high rate after heating exists in particular in the production of composite materials comprising a polymer matrix of trimerized aliphatic isocyanates by pultrusion. This process is often used for continuous and thus particularly economic production of composite materials.

The production of fiber-composite materials based on aliphatic or cycloaliphatic polyisocyanates having a high ratio of isocyanate groups to hydroxyl, thiol and amino groups in the reaction mixture by pultrusion has not yet been described in public. Such a process requires a catalyst which at room temperature shows only low catalytic acitivity—ideally none whatsoever—and after temperature elevation brings about a very rapid crosslinking of the isocyanate groups in the reaction mixture. The low activity at room temperature allows long-term storage of a reaction mixture of polyisocyanate and catalyst without the incipient crosslinking of the polyisocyanates resulting in a viscosity increase which impedes or renders impossible further processing. Also desirable is a high catalytic activity after activation of the catalyst to achieve high production speeds. Since the activation of the catalysts used in the conventional systems is effected by heating, a catalyst which crosslinks isocyanate groups should likewise be activatable by heating. This would provide a system composed of catalyst and (cyclo)aliphatic polyisocyanate which is processable in the machines conventionally employed for pultrusion without requiring the machines employed to be adapted greatly.

The production of composite materials with polymer matrices constructed from unsaturated polyester resin (UP resin) or epoxy resins is already known. The pultrusion process is also known for producing these materials. The disadvantage of UP resin is the severe odor development resulting from the styrene present. In addition, the mechanical properties such as for example tensile elastic modulus or flexural strength are generally not sufficiently well developed. UP resin also has very low adhesive properties. The disadvantage of epoxy resins is that the ratio of epoxy resin to hardener must be very precisely observed since deviations have a severe impact on material properties. Neither material is permanently weather-resistant.

A pultrusion process based on the crosslinking of aliphatic polyisocyanates was described for the first time in the post-published patent application PCT/EP2017/073276. This document also discloses a suitable catalyst system. However, the use of polyethylene glycol described therein results in poorer mechanical properties of the polymer matrix. Systems which have an even longer pot life but can nevertheless be cured at lower temperatures than the known system are also desirable for applications other than pultrusion. The initial viscosity of the resin should also be as low as possible in order to facilitate processing.

SUMMARY

This problem is solved by the embodiments of the present invention that are disclosed in the claims and in this description.

In a first embodiment the present invention relates to a polymerizable composition containing
a) at least one polyisocyanate having isocyanate groups selected from the group consisting of aliphatically, cycloaliphatically, araliphatically and aromatically bonded isocyanate groups; and
b) at least one compound of formula (I)

wherein $R^1$ and $R^2$ are independently of one another selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl;

$R^5$ is selected from the group consisting of propylene, butylene, pentylene and a radical of formula (II), preferably from butylene and the radical of formula (II);

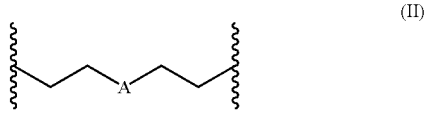

(II)

wherein A in formula (II) is selected from the group consisting of O, S and $NR^3$, wherein $R^3$ is selected from the group consisting of hydrogen, methyl, ethyl, propyl, isopropyl, butyl and isobutyl, preferably hydrogen and methyl; and B is independently of A selected from the group consisting of OH, SH $NHR^4$ and $NH_2$, wherein $R^4$ is selected from the group consisting of methyl, ethyl and propyl, preferably methyl.

When $R^5$ is a radical of formula (II) a compound of formula (III) results

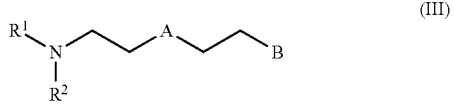

(III)

The ratio of isocyanate groups to isocyanate-reactive groups in the polymerizable composition is at least 2:1 and at least 80% of the isocyanate groups present in the polymerizable composition are aliphatically, cycloaliphatically or araliphatically bonded.

Preferably at least 90%, more preferably at least 95% and particularly preferably at least 98% of the isocyanate groups present in the polymerizable composition are aliphatically, araliphatically and/or cycloaliphatically bonded.

DETAILED DESCRIPTION

A "polymerizable composition" is a composition which contains at least the above-defined components and may be cured to afford a polymer by crosslinking of the free isocyanate groups present in the composition. The compound of formula (I) acts as a catalyst which brings about the crosslinking of the isocyanate groups.

This crosslinking of at least two isocyanate groups preferably forms isocyanurate and/or uretdione groups. Isocyanurate groups are formed predominantly and uretdione groups are only a byproduct. To the extent that isocyanurate groups are formed it is preferable when three isocyanate groups are crosslinked per isocyanurate group formed.

The quantity ratio of the compound of formula (I) on the one hand to the at least one polyisocyanate having isocyanate groups selected from the group consisting of aliphatically, cycloaliphatically and araliphatically bonded isocyanate groups on the other hand is chosen such that at temperatures between 80° C. and 250° C. it is possible to crosslink at least 80% of the free isocyanate groups present within not more than one hour. This condition is preferably met when the weight ratio of the compound of formula (I) to the entirety of the polyisocyanates present in the polymerizable composition is between 1:1000 and 1:20, more preferably between 1:500 and 1:20, yet more preferably between 1:400 and 1:20, and most preferably between 1:300 and 1:20.

The ratio of isocyanate groups to isocyanate-reactive groups in the polymerizable composition is preferably at least 5:1 and more preferably at least 10:1. The term "isocyanate-reactive groups" is to be understood as meaning hydroxyl, thiol and amino groups.

In a preferred embodiment of the present invention the polymerizable composition contains a) at least one polyisocyanate having cycloaliphatically bonded isocyanate groups and/or at least one polyisocyanate having araliphatically bonded isocyanate groups and b) at least one compound of formula (I) as defined hereinabove.

Polyisocyanate

In the present application the term "polyisocyanate" is to be understood as meaning any compound comprising on average at least 1.8, preferably at least 2.0 and particularly preferably 2.1 isocyanate groups. By contrast "monoisocyanate" is to be understood as meaning a compound having on average not more than 1.6 isocyanate groups per molecule, in particular only having one isocyanate group per molecule.

In the present application the term "polyisocyanates" refers to both monomeric and/or oligomeric polyisocyanates. For the understanding of many aspects of the invention, however, it is important to distinguish between monomeric diisocyanates and oligomeric polyisocyanates. Where reference is made in the present application to "oligomeric polyisocyanates", this means polyisocyanates formed from at least two monomeric diisocyanate molecules, i.e. compounds that constitute or contain a reaction product formed from at least two monomeric diisocyanate molecules.

Oligomeric Isocyanates

Oligomeric isocyanates are obtained by "modification" of a monomeric isocyanate. "Modification" is to be understood as meaning the reaction of monomeric isocyanates to afford oligomeric isocyanates having a uretdione, isocyanurate, allophanate, biuret, iminooxadiazinedione and/or oxadiazinetrione structure. Preferably employed as reactants for the production of oligomeric isocyanates are diisocyanates.

For example, hexamethylene diisocyanate (HDI) is a "monomeric diisocyanate" since it contains two isocyanate groups and is not a reaction product of at least two polyisocyanate molecules:

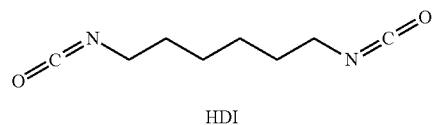

HDI

By contrast, reaction products of at least two HDI molecules which still have at least two isocyanate groups are "oligomeric polyisocyanates" in the context of the invention. Proceeding from monomeric HDI, representatives of such "oligomeric polyisocyanates" include for example the HDI isocyanurate and the HDI biuret each constructed from three monomeric HDI units:

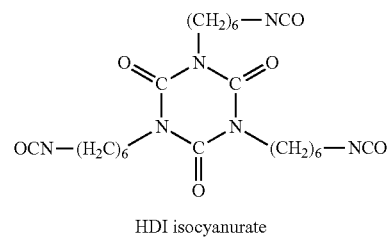

HDI isocyanurate

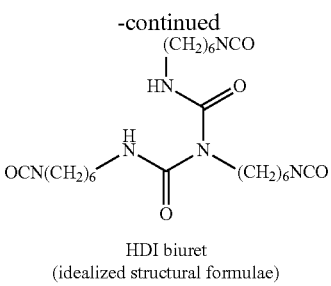

HDI biuret
(idealized structural formulae)

Production processes for oligomeric polyisocyanates having a uretdione, isocyanurate, allophanate, biuret, iminooxadiazinedione and/or oxadiazinetrione structure are described, for example, in J. Prakt. Chem. 336 (1994) 185-200, in DE-A 1 670 666, DE-A 1 954 093, DE-A 2 414 413, DE-A 2 452 532, DE-A 2 641 380, DE-A 3 700 209, DE-A 3 900 053 and DE-A 3 928 503 or in EP-A 0 336 205, EP-A 0 339 396 and EP-A 0 798 299.

It is particularly preferable when the monomeric isocyanates defined hereinbelow are used as the starting materials for modification.

The polymerizable composition according to the invention may contain oligomeric and polymeric polyisocyanates in any desired mixing ratios. For reasons of industrial safety, preference is in principle given to polymerizable compositions whose polyisocyanate component, i.e. the entirety of all polyisocyanates present in said composition, consists of oligomeric polyisocyanates to an extent of at least 90% by weight, preferably at least 95% by weight and more preferably at least 98% by weight. However, if desired, for example for reducing the viscosity of the polymerizable composition, the polyisocyanate component may also contain up to 20% by weight or preferably up to 50% by weight of monomeric polyisocyanates.

Isocyanates Having Aliphatically Bonded Isocyanate Groups

In an isocyanate having aliphatically bonded isocyanate groups all isocyanate groups are bonded to a carbon atom that is part of an open carbon chain. This may be unsaturated at one or more sites. The aliphatically bonded isocyanate group or—in the case of polyisocyanates—the aliphatically bonded isocyanate groups are preferably bonded at the terminal carbon atoms of the carbon chain.

Polyisocyanates having aliphatically bonded isocyanate groups that are particularly suitable according to the invention are 1,4-diisocyanatobutane (BDI), 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane and 1,10-diisocyanatodecane.

Isocyanates Having Cycloaliphatically Bonded Isocyanate Groups

In an isocyanate having cycloaliphatically bonded isocyanate groups all isocyanate groups are bonded to carbon atoms which are part of a closed ring of carbon atoms. This ring may be unsaturated at one or more sites provided that it does not attain aromatic character as a result of the presence of double bonds.

Polyisocyanates having cycloaliphatically bonded isocyanate groups that are particularly suitable according to the invention are 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane (H12M DI), 1,3- and 1,4-bis(isocyanatomethyl)cyclohexane, bis(isocyanatomethyl)norbornane (NBDI), 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetra methyl-1,1'-bi(cyclohexyl), 1,8-diisocyanato-p-menthane, 1,3-diisocyanatoadamantane and 1,3-dimethyl-5,7-diisocyanatoadamantane.

Isocyanates Having Araliphatically Bonded Isocyanate Groups

In an isocyanate having araliphatically bonded isocyanate groups all isocyanate groups are bonded to methylene radicals which are in turn bonded to an aromatic ring.

Polyisocyanates having araliphatically bonded isocyanate groups that are particularly suitable according to the invention are 1,3- and 1,4-bis(isocyanatomethyl)benzene (xylylene diisocyanate; XDI), 1,3- and 1,4-bis(1-isocyanato-1-methylethyl)benzene (TMXDI) and bis(4-(1-isocyanato-1-methylethyl)phenyl) carbonate.

According to the invention the polymerizable composition may contain any desired mixtures of the abovementioned isocyanates in monomeric and/or oligomeric form.

Preferred Variants of the Compound of Formula (I)

In a preferred embodiment of the present invention, $R^5$ is a radical of formula (II), wherein A is $NR^3$ and wherein $R^3$ is selected from the group consisting of hydrogen, methyl, ethyl, propyl, isopropyl, butyl and isobutyl. $R^3$ is preferably hydrogen, methyl or ethyl. $R^3$ is particularly preferably methyl.

In a first variant of this embodiment, B is OH and $R^1$ and $R^2$ are independently of one another selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. It is preferable when $R^1$ and $R^2$ are independently of one another hydrogen, methyl or ethyl. $R^1$ and $R^2$ are particularly preferably methyl.

In a second variant of this embodiment, B is SH and $R^1$ and $R^2$ are independently of one another selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. It is preferable when $R^1$ and $R^2$ are independently of one another hydrogen, methyl or ethyl. $R^1$ and $R^2$ are particularly preferably methyl.

In a third variant of this embodiment, B is $NHR^4$ and $R^1$ and $R^2$ are independently of one another selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. It is preferable when $R^1$ and $R^2$ are independently of one another hydrogen, methyl or ethyl. $R^1$ and $R^2$ are particularly preferably methyl. In this variant, R4 is selected from the group consisting of methyl, ethyl and propyl. $R^4$ is preferably hydrogen, methyl or ethyl. $R^4$ is particularly preferably methyl.

In a fourth variant of this embodiment, B is $NH_2$ and $R^1$ and $R^2$ are independently of one another selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. It is preferable when $R^1$ and $R^2$ are independently of one another methyl or ethyl. $R^1$ and $R^2$ are particularly preferably methyl.

In a further preferred embodiment of this invention, $R^5$ is a radical according to formula (II), wherein A is oxygen.

In a first variant of this embodiment, B is OH and $R^1$ and $R^2$ are independently of one another selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. It is preferable when $R^1$ and $R^2$ are independently of one another hydrogen, methyl or ethyl. $R^1$ and $R^2$ are particularly preferably methyl.

In a second variant of this embodiment, B is SH and $R^1$ and $R^2$ are independently of one another selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. It is preferable when $R^1$ and $R^2$ are independently of one another hydrogen, methyl or ethyl. $R^1$ and $R^2$ are particularly preferably methyl.

In a third variant of this embodiment, B is $NHR^4$ and $R^1$ and $R^2$ are independently of one another selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. It is preferable when $R^1$ and $R^2$ are independently of one another methyl or ethyl. $R^1$ and $R^2$ are particularly preferably methyl. In this variant, $R^4$ is selected from the group consisting of methyl, ethyl and propyl. $R^4$ is preferably hydrogen, methyl or ethyl. $R^4$ is particularly preferably methyl.

In a fourth variant of this embodiment, B is $NH_2$ and $R^1$ and $R^2$ are independently of one another selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. It is preferable when $R^1$ and $R^2$ are independently of one another methyl or ethyl. $R^1$ and $R^2$ are particularly preferably methyl.

In yet a further preferred embodiment of this invention, $R^5$ is a radical according to formula (II), wherein A is sulfur.

In a first variant of this embodiment, B is OH and $R^1$ and $R^2$ are independently of one another selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. It is preferable when $R^1$ and $R^2$ are independently of one another hydrogen, methyl or ethyl. $R^1$ and $R^2$ are particularly preferably methyl.

In a second variant of this embodiment, B is SH and $R^1$ and $R^2$ are independently of one another selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. It is preferable when $R^1$ and $R^2$ are independently of one another hydrogen, methyl or ethyl. $R^1$ and $R^2$ are particularly preferably methyl.

In a third variant of this embodiment, B is $NHR^4$ and $R^1$ and $R^2$ are independently of one another selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. It is preferable when $R^1$ and $R^2$ are independently of one another methyl or ethyl. $R^1$ and $R^2$ are particularly preferably methyl. In this variant, $R^4$ is selected from the group consisting of methyl, ethyl and propyl. $R^4$ is preferably hydrogen, methyl or ethyl. $R^4$ is particularly preferably methyl.

In a fourth variant of this embodiment, B is $NH_2$ and $R^1$ and $R^2$ are independently of one another selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. It is preferable when $R^1$ and $R^2$ are independently of one another methyl or ethyl. $R^1$ and $R^2$ are particularly preferably methyl.

In yet a further preferred embodiment of this invention, $R^5$ is a butylene radical.

In a first variant of this embodiment, B is OH and $R^1$ and $R^2$ are independently of one another selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. It is preferable when $R^1$ and $R^2$ are independently of one another H, methyl or ethyl. $R^1$ and $R^2$ are particularly preferably methyl.

In a second variant of this embodiment, B is SH and $R^1$ and $R^2$ are independently of one another selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. It is preferable when $R^1$ and $R^2$ are independently of one another H, methyl or ethyl. $R^1$ and $R^2$ are particularly preferably methyl.

In a third variant of this embodiment, B is $NHR^4$ and $R^1$ and $R^2$ are independently of one another selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. It is preferable when $R^1$ and $R^2$ are independently of one another methyl or ethyl. $R^1$ and $R^2$ are particularly preferably methyl. In this variant, $R^4$ is selected from the group consisting of methyl, ethyl and propyl. It is preferable when $R^4$ is H, methyl or ethyl. $R^4$ is particularly preferably methyl.

In a fourth variant of this embodiment, B is $NH_2$ and $R^1$ and $R^2$ are independently of one another selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. It is preferable when $R^1$ and $R^2$ are independently of one another H, methyl or ethyl. $R^1$ and $R^2$ are particularly preferably methyl.

Isocyanate Having an Aromatically Bonded Isocyanate Group

In an isocyanate having aromatically bonded isocyanate groups all isocyanate groups are bonded directly to carbon atoms which are part of an aromatic ring.

Isocyanates having aromatically bonded isocyanate groups that are particularly suitable according to the invention are 2,4- and 2,6-diisocyanatotoluene (TDI), 2,4'- and 4,4'-diisocyanatodiphenylmethane (MDI) and 1,5-diisocyanatonaphthalene.

Kit

In a further embodiment the present invention relates to a kit containing
a) at least one polyisocyanate having isocyanate groups selected from the group consisting of aliphatically, cycloaliphatically, araliphatically and aromatically bonded isocyanate groups; and
b) at least one compound of formula (I);

(I)

wherein at least 80% of the isocyanate groups present in the polymerizable composition are aliphatically, cycloaliphatically or araliphatically bonded.

In this embodiment preferably at least 90%, more preferably at least 95% and particularly preferably at least 98% of the isocyanate groups present in the polyisocyanate are aliphatically, araliphatically and/or cycloaliphatically bonded.

The radicals of the compound of formula (I) are defined hereinabove.

The presence of the two components as a kit means that both components are present together but in separate containers. In a preferred embodiment the kit further contains a user manual which describes the use according to the invention. It is preferable when the kit contains the component b) in an amount which is suitable for crosslinking at least 80% of the isocyanate groups present in component a) contained in the kit at a temperature between 80° C. to 250° C. in not more than 10 minutes.

Use

The present invention further relates to the use of at least one compound of the formula (I) as defined hereinabove

(I)

for crosslinking at least two isocyanate groups selected from the group consisting of aliphatically, cycloaliphatically, araliphatically and aromatically bonded isocanate groups.

All definitions recited above for the polymerizable composition also apply to this embodiment unless explicitly defined otherwise.

It is preferable when the crosslinking of the at least two isocyanate groups selected from the group consisting of aliphatically, cycloaliphatically, araliphatically and aromatically bonded isocyanate groups forms an isocyanurate group. To the extent that isocyanurate groups are formed it is preferable when three isocyanate groups are crosslinked per isocyanurate group formed.

Particular preference is given to the use for crosslinking of at least two aliphatically and/or cycloaliphatically bonded isocyanate groups. It is very particularly preferable when isocyanate groups present in at least one compound selected from the group consisting of HDI, PDI, IPDI, oligomerized HDI, oligomerized PDI and oligomerized IPDI are crosslinked with one another.

The use according to the invention preferably results in a highly crosslinked polymer. In the context of the invention chemically highly crosslinked polymers are to be understood as meaning those having an average chemical network arc length Mc of not more than 1000 g/mol, preferably not more than 500 g/mol, particularly preferably not more than 400 g/mol and very particularly preferably not more than 300 g/mol. The average network arc length is defined as the number-average molar mass between the network nodes in a polymer network.

The average network arc length and the crosslinking density may be calculated via swelling measurements according to the HERMANS-FLORY-WALL method in suitable solvents or by measurement of the elastic modulus in the melt in the linear-elastic range at low frequencies, see also John d. Ferry: Viscoelastic properties of polymers 3rd Edition, 1980.

The network arc length is preferably determined by rheological measurement.

In the context of the invention highly crosslinked materials are to be understood as also meaning those having a storage shear modulus in the melt measured in the linear range of at least $3 \times 10^6$ Pa, preferably at least $5 \times 10^6$ Pa and very particularly preferably at least $8 \times 10^6$ Pa.

In a particularly preferred embodiment the compound of formula (I) is used as a thermolatent catalyst.

The use as a thermolatent catalyst is characterized in that the catalyst is mixed with the isocyanate to be crosslinked and the thus-formed reaction mixture is initially stored at a temperature at which the catalyst shows no significant catalytic activity. The temperature is subsequently raised to a value at which the catalyst is active, thus commencing the crosslinking reaction. Storage is preferably carried out at temperatures of not more than 40° C., more preferably not more than 30° C. The storage duration is measured such that the viscosity of the reaction mixture increases by not more than 200% over this period. At storage temperatures of 30° C. this is preferably a period of 30 minutes to 5 days, more preferably of 30 minutes to 24 hours. To activate the catalyst the temperature is raised to 50° C. to 250° C., preferably to 80° C. to 250° C. and more preferably to 120° C. to 250° C.

The present invention further relates to the use of a polymerizable composition as defined hereinabove or of a kit as defined hereinabove for producing a polymer.

Said polymer is preferably the matrix material of a composite material. It is particularly preferably the matrix material of a highly filled composite material.

The term "composite material" is well known to those skilled in the art and in principle concerns materials where a filler is embedded in a matrix. According to the invention this matrix is a polymer formed by the crosslinking of the isocyanate groups present in the polyisocyanate component a).

The filler may be any suitable organic or inorganic filler known to those skilled in the art. It may have any desired geometry. However, it is preferably a fibrous organic or inorganic filler.

The aspect ratio of a fibrous filler is greater than 1000, preferably greater than 5000, more preferably greater than 10 000 and most preferably greater than 50 000. The aspect ratio is defined as the length of the fibers divided by the diameter.

While complying with the above-defined aspect ratio the fibrous fillers preferably have a minimum length of 1 m, particularly preferably 50 m and very particularly preferably 100 m.

Preferred inorganic fibers are glass fibers, basalt fibers, boron fibers, ceramic fibers, whiskers, silica fibers and metallic reinforcing fibers. Preferred organic fibers are aramid fibers, carbon fibers, carbon nanotubes, polyester fibers, nylon fibers and Plexiglass fibers. Preferred natural fibers are flax fibers, hemp fibers, wood fibers, cellulose fibers and sisal fibers.

The ratio of the proportions of filler and polymer matrix in the composite material is described as the filler loading. Highly filled systems feature a weight fraction of the filler between 50% by weight and 90% by weight, preferably between 60% by weight and 85% by weight and yet more preferably between 70% by weight and 85% by weight.

Process

In yet a further embodiment the present invention relates to a process for producing a polymer containing the steps of
a) mixing at least one polyisocyanate having isocyanate groups selected from the group consisting of aliphatically, cycloaliphatically, aromatically and araliphatically bonded isocyanate groups with at least one compound of formula (I);

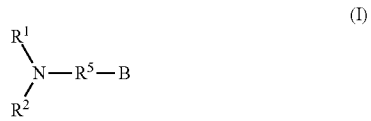

b) curing the polymerizable composition obtained in process step a) by raising the temperature to at least 50° C.,
wherein at commencement of process step b) the ratio of isocyanate groups to isocyanate-reactive groups in the polymerizable composition is at least 2:1 and at least 80% of the isocyanate groups present in the polymerizable composition are aliphatically, araliphatically and/or cycloaliphatically bonded.

All definitions of the polyisocyanates employable according to the invention and the radicals of the compound of formula (I) recited hereinabove also apply to these embodiments.

The produced polymer is preferably highly crosslinked as defined hereinabove.

The mixing of the components in process step a) may be carried out using any suitable processes known to those skilled in the art. Process step a) is preferably performed at temperatures of not more than 40° C. Present at the end of process step a) is a reaction mixture which corresponds to the polymerizable composition disclosed at the beginning of the present application. Accordingly, when regarded in isolation, process step a) discloses a process for providing the polymerizable composition according to the invention.

Suitable quantity ratios of the components to be employed are described hereinabove in the context of the polymerizable composition.

Since the compounds of formula (I) are thermolatent catalysts, process step b) is preferably initiated by elevating the temperature of the polymerizable composition. The elevated temperature is preferably also maintained over the total duration of process step b). It is preferable when a temperature of at least 50° C. is maintained during the entirety of process step b). The temperature during process step b) is more preferably between 50° C. and 250° C., yet more preferably between 80° C. and 250° C. and most preferably between 120° C. and 250° C.

Since the compound of formula (I) shows no significant catalytic activity at temperatures up to 40° C. the polymerizable composition obtained in process step a) may before commencement of process step b) be stored for at least 30 minutes, preferably at least 1 hour and more preferably at least 3 hours while complying with this temperature limit without the viscosity thereof increasing by more than 200%. This storage may have a duration of up to 24 hours.

The "curing" of the polymerizable composition is effected by crosslinking of the isocyanate groups present in the polyisocyanate. This forms a solid polymer network. Since the compound of formula (I) especially catalyzes the formation of isocyanurate groups it is preferable when isocyanurate groups are formed to an extent of at least 80 mol % while the sum of uretdione, urethane, allophanate, urea, biuret, iminooxadiazinedione and oxadiazinetrione structures formed during curing is below 20 mol %.

Process step b) is complete when the liquid polymerizable composition has formed a solid which retains its shape without external supports such as casting molds for example. This is preferably the case when at least 75%, more preferably at least 80%, yet more preferably at least 85% and most preferably at least 90% of the isocyanate groups present in the polymerizable composition at commencement of process step b) have been consumed. At temperatures between 80° C. and 250° C. this state is preferably achieved after not more than 20 minutes.

When production of a composite material is intended the polymerizable composition must contain a filler at commencement of process step b). Said filler may be introduced into the polymerizable composition in various ways. The polymerizable composition as is present at the end of process step a) may be mixed with the filler. However, it is also possible to initially mix with the filler a polyisocyanate having isocyanate groups selected from the group consisting of aliphatically, cycloaliphatically, araliphatically and aromatically bonded isocyanate groups before it is employed in process step a). Suitable fillers are described hereinabove. Process step b) thus affords a composite material where the cured reaction mixture forms a polymer matrix in which the filler has been embedded.

In a preferred embodiment of the invention the filler is a fibrous filler selected from the group consisting of glass fibers, basalt fibers, carbon fibers and mixtures thereof. The fibers may be in loose form but may also have been woven or knitted in any form known to those skilled in the art to form mats or tiles. It is preferable when less than 50% by weight, more preferably less than 35% by weight, yet more preferably less than 20% by weight and most preferably less than 10% by weight of the fibers used are in the form of mats or tiles.

In a particularly preferred embodiment of the present invention the process according to the invention for producing a composite material is a pultrusion process.

Pultrusion is a continuous production process for manufacturing fiber-reinforced plastics profiles. The basic construction of a pultrusion system consists of the fiber rack, apparatuses for fiber guiding, an impregnation means, a curing mold, reciprocal pulling apparatuses and a cutting unit.

The reels of rovings are stored in the fiber rack. From the fiber rack, the fiber rovings are guided via fiber guides to the impregnation means where the fibers are wetted with the reaction mixture from process step a). The fibers are generally already aligned or pre-sorted according to the subsequently desired profile shape via the fiber guides or else the impregnation means. Particularly suitable are fibers which while complying with the aspect ratio defined above have a minimum length of at least 50 m.

Mats, weaves, NCFs or nonwovens may also be integrated into the process if required in order to optimize the mechanical properties for the desired use. Impregnation of the fibers with the reaction mixture may be effected by any methods known to those skilled in the art in the context of the pultrusion process.

The resin-impregnated fibers subsequently pass through the shape-conferring curing mold where the crosslinking of the reactive groups of the resin mixture to form the polymer (matrix) is effected by elevated temperature. This is process step b) of the process. This is frequently followed by a cooling zone, for example air cooling, before the now complete semifinished product is pulled through the alternating pullers. These ensure continuous transport of the material throughout the pultrusion process. In the last process step, the material is cut to the desired length. This is frequently done using a 'flying saw', meaning that the saw runs at the same speed as the material and in so doing cuts it. In this way, a straight cut edge is obtained, and the profile is prevented from backing up and the process is prevented from being stopped during the sawing step.

The present application further relates to a polymer obtainable by the above-described process.

Compared to the catalysts described in PCT/EP2017/073276, use of the catalysts according to the invention provides a number of advantages.

The amine catalysts according to the invention preferably form a clear solution in known aliphatic isocyanates. The amine catalysts according to the invention are not ionic compounds and thus do not require elaborate stabilization to prevent clouding of the reaction mass after polymerization. Due to the absence of ionic compounds the catalysts according to the invention do not impair the electrical properties of the reaction product in respect of dielectric strength.

The working examples which follow serve merely to illustrate the invention. They are not intended to limit the scope of the claims in any way.

WORKING EXAMPLES

General Information:

Unless otherwise stated all reported percentage values are in percent by weight (% by weight).

The ambient temperature of 23° C. at the time of performing the experiments is referred to as RT (room temperature).

The methods detailed hereinafter for determination of the appropriate parameters were used for performance and evaluation of the examples and are also the methods for determination of the parameters of relevance in accordance with the invention in general.

Determination of Phase Transitions by DSC

The phase transitions were determined by means of DSC (differential scanning calorimetry) with a Mettler DSC 12E (Mettler Toledo GmbH, Giessen, Germany) in accordance with DIN EN 61006. Calibration was effected via the melt onset temperature of indium and lead. 10 mg of substance were weighed out in standard capsules. The measurement was effected by three heating runs from −50° C. to +200° C. at a heating rate of 20 K/min with subsequent cooling at a cooling rate of 320 K/min. Cooling was effected by means of liquid nitrogen. The purge gas used was nitrogen. The values reported are in each case based on evaluation of the 2nd heating curve. The melting temperatures $T_m$ were obtained from the temperatures at the maxima of the heat flow curves. The glass transition temperature $T_g$ was obtained from the temperature at half the height of a glass transition step.

Determination of Infrared Spectra

The infrared spectra were measured on a Bruker FT-IR spectrometer equipped with an ATR unit.

Starting Compounds

Polyisocyanate A1 is an HDI trimer (NCO functionality >3) having an NCO content of 23.0% by weight from Covestro AG. It has a viscosity of about 1200 mPa·s at 23° C. (DIN EN ISO 3219/A.3).

Polyisocyanate A2 is an HDI trimer (NCO functionality >3) having an NCO content of 23.5% by weight from Covestro AG. It has a viscosity of about 730 mPa·s at 23° C. (DIN EN ISO 3219/A.3).

Polyisocyanate A3 is a PDI trimer (NCO functionality >3) having an NCO content of 21.5% by weight from Covestro AG. It has a viscosity of about 9500 mPa·s at 23° C. (DIN EN ISO 3219/A.3).

Polyisocyanate A4 is an HDI/IPDI polyisocyanate having an NCO content of 21.0% by weight from Covestro AG. It has a viscosity of about 22,500 mPa·s at 23° C. (DIN EN ISO 3219/A.3).

K1: N,N,N'-trimethylaminoethylethanolamine having an OH number of 384 mg KOH/g was obtained from Huntsman Corporation.

K2: 2-(2-dimethylaminoethoxy)ethanol having an OH number of 421 mg KOH/g was obtained from Huntsman Corporation.

K3: Benzyldimethylamine was obtained from Huntsman Corporation.

K4: 2,2'-dimorpholine diethyl ether was obtained from Huntsman Corporation.

K5: N-(3-dimethylaminopropyl)-N,N-diisopropanolamine having an OH number of 514 mg KOH/g was obtained from Huntsman Corporation.

K6: Pentamethyldiethylenetriamine was obtained from Covestro AG.

K7: N,N,N'-trimethyl-N'-hydroxyethylbisaminoethyl ether having an OH number of 295 mg KOH/g was obtained from Huntsman Corporation.

K8: N,N,N',N'',N''-pentamethyldipropylenetriamine was obtained from Huntsman Corporation.

K9: N,N-bis(3-dimethylaminopropyl)-N-isopropanolamine having an OH number of 229 mg KOH/g was obtained from Huntsman Corporation.

K10: N'-(3-(dimethylamino)propyl)-N,N-dimethyl-1,3-propanediamine was obtained from Huntsman Corporation.

K11: A mixture of 15% bis[(dimethylamino)methyl]phenol and 2,4,6-tris(dimethylaminomethyl)phenol was obtained from Evonik Industries AG.

K12: Sodium {N-methyl[(2-hydroxy-5-nonylphenyl)methyl]amino}acetate dissolved in glycol was obtained from Evonik Industries AG.

K13: Tris(dimethylaminopropyl)hydrotriazine was obtained from Evonik Industries AG.

Polyethylene glycol (PEG) 400 was obtained with a purity of >99% by weight from ACROS.

The mold release agent INT-1940® was obtained from Axel Plastics Research Laboratories, INC. and according to the data sheet is a mixture of organic fatty acids and esters.

All raw materials except for the catalysts were degassed under reduced pressure prior to use and the polyethylene glycol was additionally dried.

Production of the Reaction Mixture

Unless otherwise stated the reaction mixture was produced by mixing polyisocyanate (A1-A4) with a corresponding amount of catalyst (K1-K14) and additive at 23° C. in a Speedmixer DAC 150.1 FVZ from Hauschild at 2750 min$^{-1}$. Said mixture was then poured into a suitable mold for crosslinking and cured without further treatment or used for pultrusion without further treatment.

Performance of the Pultrusion Experiments

The pultrusion experiments were carried out using a Pultrex Px 500-10 system from Pultrex. The fiber bundles were in rolls on a rack and were first pulled through a fiber presort/orientation (perforated plate), then impregnated with resin at room temperature by means of an open dipping bath with deflectors and strippers or in an injection box and then pulled into the heated mold (profile block). The mold had a length of 1000 mm over which were distributed 4 successively connected heating zones of equal size (H1 to H4, H1 at the glass fiber intake). This was followed by an air-cooled cooling zone of 5 m, to which the two pullers were connected. These worked with an appropriate offset, such that there was a continuous tensile force on the profile which transported the profile in the direction of the saw which followed after the pullers and cut the profile to the desired length. The profile cross section was a rectangle having dimensions of 120 mm×3 mm. When using an immersion bath to wet the fibers the stripped excess resin was returned to the bath and reused.

Working Example 1

A resin mixture composed of polyisocyanate A1 (4.86 kg), catalyst K1 (0.01 kg), zinc stearate (0.03 kg) and INT-1940® (0.10 kg) was produced as described hereinabove. The glass fiber bundles (128 rovings) were oriented and guided into the injection box which was fixedly connected to the mold and filled with the resin mixture via a window opening on the top of the box. The glass fibers thus impregnated with resin were pulled directly into the heated mold. The temperature zones were H1=180° C., H2=220° C., H3=200° C. and H4=180° C. The pulling rate was 0.3 m/min. The takeoff forces were 0.3 t. 8 m of profile were produced. Further measured results are summarized in table 2.

Working Examples 2-13

The amounts of polyisocyanate reported in table 1, catalyst and optionally additive were treated in accordance with the abovementioned production procedure for reaction mixtures. Curing in the oven was performed according to the times and temperatures likewise reported in.

The $T_g$ of the cured reaction mixtures was 78-154° C. The viscosities of the inventive reaction mixtures with polyisocyanate A1 (examples 2, 3 and 4) were 1.58-1.61 Pa·s immediately after production and rose to 1.65-1.77 Pa·s over 4 h. The viscosity with polyisocyanate A3 (example 12) was 10.4 Pa·s immediately after production and rose to 10.6 Pa·s over 4 h. The viscosity with polyisocyanate A4 (example 13) was 23.0 Pa·s immediately after production and rose to 24.1 Pa·s over 4 h.

Working examples 2 and 3 show that different catalysts according to formula (I) may be utilized for curing of isocyanates. The inventive examples 4 to 7 show that different amounts of catalyst can result in polymerization even at relatively low curing temperatures. Embodiments 9 to 11 show that no additives are necessary, but different additives are tolerated. Effective catalysis was also demonstrated for further isocyanates by means of inventive examples 12 and 13.

Comparative Examples 14-24

The amounts of polyisocyanate reported in table 1, catalyst and optionally additive were treated in accordance with the abovementioned production procedure for reaction mixtures. Curing in the oven was performed according to the times and temperatures likewise reported table 1.

The comparative examples show that various other amine-based catalysts do not result in solid materials under the same curing conditions as the inventive examples.

Working Examples 25-33 for Identifying Further Suitable Compounds for Producing Adducts The catalytic activity of the compounds was determined with an n-hexyl isocyanate as the model substrate. The most quantitatively significant reaction product was a trimer. The reaction of the NCO groups was verified by $^{13}$C-NMR at 100 MHz. The solvent used for the samples was deuterochloroform, its non-deuterated fraction serving as internal standard.

Compounds K14 to K16 were tested.

K14: 3-(dimethylamino)-propanol
K15: 4-(dimethylamino)-butanol
K16: 5-(dimethylamino)-pentanol n-Hexyl isocyanate was in each case admixed with the concentrations of compounds K14, K15 or K6 reported in table 2 which follows. Incubation was carried out under the specified conditions.

TABLE 2

| Experiment | Compound | Reaction parameters | Result |
|---|---|---|---|
| 29 | 3-(dimethylamino)-propanol | 80° C. for 2 h, 20 mol % | Trimerization detectable but residual NCO content |
| 30 | 3-(dimethylamino)-propanol | 150° C. for 5 min, 20 mol % | Trimerization detectable but residual NCO content |
| 31 | 3-(dimethylamino)-propanol | 150° C. for 5 min, 0.5 mol % | No reaction detectable |
| 32 | 4-(dimethylamino)-butanol | 80° C. for 2 h, 20 mol % | Complete reaction of NCO groups |
| 33 | 4-(dimethylamino)-butanol | 150° C. for 5 min, 20 mol % | Complete reaction of NCO groups |
| 34 | 4-(dimethylamino)-butanol | 150° C. for 5 min, 0.5 mol % | Complete reaction of NCO groups |

TABLE 2-continued

| Experiment | Compound | Reaction parameters | Result |
|---|---|---|---|
| 35 | 5-(dimethylamino)-pentanol | 80° C., 2 h, 20 mol % | No reaction detectable |
| 36 | 5-(dimethylamino)-pentanol | 150° C., 5 min, 20 mol % | Complete reaction of NCO groups |
| 37 | 5-(dimethylamino)-pentanol | 150° C., 5 min, 0.5 mol % | No reaction detectable |

The experiment shows that alkylene radicals without heteroatoms are also suitable as radical $R^5$ to the extent that they contain 3 to 5 carbon atoms. Radicals $R^5$ made of 4 carbon atoms are optimal. Corresponding compounds are of course also suitable starting materials for the production of the inventive adducts.

TABLE 1

Compositions, production conditions and material properties of working and comparative examples.

| Ex. | Isocyanate | Amount of polyisocyanate [g] | Cat. | Amount [g] | Additives | Amount [g] | Curing temperature [° C.] | Curing time [min] | Pot life at RT | $T_g$ after curing | Appearance after curing |
|---|---|---|---|---|---|---|---|---|---|---|---|
| 2 (inv.) | A1 | 97 | K1 | 0.5 | zinc stearate | 0.5 | 220 | 5 | >4 h | 103° C. | solid |
| 3 (inv.) | A1 | 97 | K2 | 0.5 | zinc stearate | 0.5 | 220 | 5 | >4 h | 91° C. | solid |
| 4 (inv.) | A1 | 97.25 | K1 | 0.25 | zinc stearate | 0.5 | 120 | 30 | >4 h | 107° C. | solid |
| 5 (inv.) | A1 | 97 | K1 | 0.5 | zinc stearate | 0.5 | 120 | 30 | n.d. | 101° C. | solid |
| 6 (inv.) | A1 | 96.5 | K1 | 1 | zinc stearate | 0.5 | 120 | 30 | n.d. | 104° C. | solid |
| 7 (inv.) | A1 | 95.5 | K1 | 2 | zinc stearate | 0.5 | 120 | 30 | n.d. | 102° C. | solid |
| 8 (inv.) | A2 | 93.5 | K1 | 0.25 | zinc stearate/ PEG 400 | 0.5/0.75 | 220 | 5 | n.d. | 154° C. | solid |
| 9 (inv.) | A1 | 99.75 | K1 | 0.25 | | | 220 | 22 | n.d. | 113° C. | solid |
| 10 (inv.) | A1 | 99.75 | K1 | 0.25 | PEG 400 | 2 | 220 | 5 | n.d. | 108° C. | solid |
| 11 (inv.) | A1 | 99.75 | K1 | 0.25 | PEG 400 | 4 | 220 | 5 | n.d. | 92° C. | solid |
| 12 (inv.) | A3 | 97.25 | K1 | 0.25 | zinc stearate | 0.5 | 220 | 5 | >4 h | 135° C. | solid |
| 13 (inv.) | A4 | 97.25 | K1 | 0.25 | zinc stearate | 0.5 | 220 | 5 | >4 h | 78° C. | solid |
| 14 (comp.) | A1 | 97 | K3 | 0.5 | zinc stearate | 0.5 | 220 | 5 | n.d. | does not cure | liquid |
| 15 (comp.) | A1 | 97 | K4 | 0.5 | zinc stearate | 0.5 | 220 | 5 | n.d. | does not cure | liquid |
| 16 (comp.) | A1 | 97 | K5 | 0.5 | zinc stearate | 0.5 | 220 | 5 | n.d. | does not cure | liquid |
| 17 (comp.) | A1 | 97 | K6 | 0.5 | zinc stearate | 0.5 | 220 | 5 | n.d. | does not cure | liquid |
| 18 (comp.) | A1 | 97 | K7 | 0.5 | zinc stearate | 0.5 | 220 | 5 | n.d. | does not cure | liquid |
| 19 (comp.) | A1 | 97 | K8 | 0.5 | zinc stearate | 0.5 | 220 | 5 | n.d. | does not cure | liquid |
| 20 (comp.) | A1 | 97 | K9 | 0.5 | zinc stearate | 0.5 | 220 | 5 | n.d. | does not cure | liquid |
| 21 (comp.) | A1 | 97 | K10 | 0.5 | zinc stearate | 0.5 | 220 | 5 | n.d. | does not cure | liquid |
| 22 (comp.) | A1 | 97 | K11 | 0.5 | zinc stearate | 0.5 | 220 | 5 | n.d. | does not cure | liquid |
| 23 (comp.) | A1 | 97 | K12 | 0.5 | zinc stearate | 0.5 | 220 | 5 | n.d. | does not cure | liquid |
| 24 (comp.) | A1 | 97 | K13 | 0.5 | zinc stearate | 0.5 | 220 | 5 | n.d. | does not cure | liquid | n.d.: not determined

TABLE 2

Mechanical characteristics of inventive composite example 1.

| Test | | | Example 1 (inv.) |
|---|---|---|---|
| Tensile test | DIN EN ISO 527 | | |
| Tensile modulus | | GPa | 54.7 |
| Yield stress | | MPa | 876 |
| Elongation at break | | % | 1.65 |
| Flexural test | DIN EN ISO 14125 | | |
| Flexural modulus (axial) | | GPa | 47.1 |
| Flexural stress (axial) | | MPa | 650 |
| Flexural strain (axial) | | % | 2.87 |
| Flexural modulus (transv.) | | GPa | 10.9 |
| Flexural stress (transv.) | | MPa | 54 |
| Flexural strain (transv.) | | % | 0.57 |
| Charpy | DIN EN ISO 179 | | |
| Ak | | kJ/m$^2$ | 353 |
| Filler content | DIN EN ISO 1172/A | wt % | 81.6 |
| Density | DIN EN ISO 1183-1 | g/cm$^3$ | 2.142 |
| Coefficient of expansion according to DIN 53572 | | | |
| axial | | 10$^{-6}$/K | 5.70 |
| transv. | | 10$^{-6}$/K | 3.30 |
| DMA (3-point flexural test) | DIN EN ISO 6721-1 | | |
| Tangent δ | | ° C. | 106 |
| ILSS | DIN EN ISO 14130 | | |
| axial | | MPa | 28.5 |
| transv. | | MPa | 4.78 |

The invention claimed is:

1. A polymerizable composition comprising
a) at least one polyisocyanate having isocyanate groups selected from the group consisting of aliphatically and cycloaliphatically bonded isocyanate groups, and combinations thereof;

b) at least one compound of formula (I)

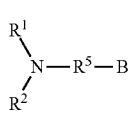

wherein $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl, and unbranched C7-alkyl, $R^5$ is selected from the group consisting of propylene, butylene, pentylene, and a radical of formula (II),

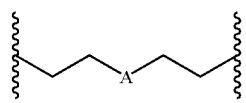

wherein A in formula (II) is selected from the group consisting of O, S, and $NR^3$, wherein $R^3$ is selected from the group consisting of hydrogen, methyl, ethyl, propyl, isopropyl, butyl, and isobutyl, and B is independently of A selected from the group consisting of OH, SH, $NHR^4$, and $NH_2$, wherein $R^4$ is selected from the group consisting of methyl, ethyl, and propyl; and c) from 50% by weight to 90% by weight of organic and/or inorganic filler based on a total weight of the polymerizable composition, the organic and/or inorganic filler optionally comprising fibers, wherein a ratio of isocyanate groups to isocyanate-reactive groups in the polymerizable composition is at least 8:1 and at least 80% of the isocyanate groups present in the polymerizable composition are aliphatically and/or cycloaliphatically bonded.

2. The polymerizable composition as claimed in claim 1, wherein in formula (II) A is $NR^3$ and $R^3$ is selected from the group consisting of hydrogen, methyl, ethyl, propyl, isopropyl, butyl, and isobutyl.

3. The polymerizable composition as claimed in claim 2, wherein $R^1$, $R^2$, and $R^3$ are methyl and B is OH.

4. The polymerizable composition as claimed in claim 1, wherein in formula (II) A is oxygen.

5. The polymerizable composition as claimed in claim 4, wherein $R^1$ and $R^2$ are methyl and B is OH.

6. The polymerizable composition as claimed in claim 1, wherein in formula (I) $R^5$ is butylene.

7. The polymerizable composition as claimed in claim 1, wherein the at least one polyisocyanate comprises a uretdione, an isocyanurate, an allophanate, a biuret, an iminooxadiazinedione, an oxadiazinetrione, or a combination thereof.

8. The polymerizable composition as claimed in claim 1, wherein the organic and/or inorganic filler comprises fibers having a minimum length of 1 m.

9. A method of crosslinking isocyanate groups, comprising combining a compound of formula (I) as defined in claim 1 with at least one polyisocyanate having isocyanate groups consisting of at least two aliphatically and/or cycloaliphatically bonded isocyanate groups to form a polymerizable composition, wherein a ratio of isocyanate groups to isocyanate-reactive groups in the polymerizable composition is at least 8:1 and at least 80% of the isocyanate groups present in the polymerizable composition are aliphatically and/or cycloaliphatically bonded, and wherein curing the polymerizable composition forms at least 80 mol % of isocyanurate groups based on a sum of isocyanurate groups, uretdione groups, urethane groups, allophanate groups, urea groups, biuret groups, iminooxadiazinedione groups, and oxadiazinetrione groups formed.

10. The method as claimed in claim 9, wherein the polymerizable composition forms a crosslinked polymer.

11. The method as claimed in claim 9, wherein the polyisocyanate comprises HDI, PDI, IPDI, H12MDI, oligomerized HDI, oligomerized PDI, oligomerized H12MDI, oligomerized IPDI, or a combination thereof.

12. A kit containing
a) at least one polyisocyanate having isocyanate groups selected from the group consisting of aliphatically and cycloaliphatically bonded isocyanate groups, and combinations thereof; and
b) at least one compound of formula (I) as defined in claim 1,
wherein the kit comprises an amount of the at least one polyisocyanate relative to an amount of the at least one compound of formula (I) to allow combination of the at least one polyisocyanate and the at least one compound of formula (I) to form a polymerizable composition having a ratio of isocyanate groups to isocyanate-reactive groups of at least 8:1 and having at least 80% of the isocyanate groups that are aliphatically and/or cycloaliphatically bonded, and wherein the kit further comprises organic and/or inorganic filler, the organic and/or inorganic filler comprising fibers having a minimum length of 1 m.

13. A process for producing a polymer comprising
a) mixing at least one polyisocyanate having isocyanate groups selected from the group consisting of aliphatically and cycloaliphatically bonded isocyanate groups, and combinations thereof with a compound of formula (I) as defined in claim 1; and
b) curing a polymerizable composition obtained in process step a) by raising the temperature to at least 50° C., wherein curing forms at least 80 mol % of isocyanurate groups based on a sum of isocyanurate groups, uretdione groups, urethane groups, allophanate groups, urea groups, biuret groups, iminooxadiazinedione groups, and oxadiazinetrione groups formed, and
wherein at commencement of process step b) a ratio of isocyanate groups to isocyanate-reactive groups in the polymerizable composition is at least 8:1 and at least 80% of the isocyanate groups present in the polymerizable composition are aliphatically and/or cycloaliphatically bonded.

14. The process as claimed in claim 13, wherein a period of at least 30 minutes elapses between an end of process step a) and commencement of process step b).

15. The process as claimed in claim 13, wherein a reaction mixture obtained in process step a) is mixed with an organic or inorganic filler before performance of process step b).

16. The process as claimed in claim 15, wherein the organic or inorganic filler consists of fibers having a minimum length of 50 m and the curing in process step b) is carried out in a heated mold which imparts the fibers wetted with the reaction mixture with a profile and stabilizes this profile through curing of the reaction mixture.

17. A polymer obtained by the process as claimed in claim in claim 13.

18. A composite material obtained by the process as claimed in claim 15.

* * * * *